United States Patent [19]

Vennett

[11] 3,869,388

[45] Mar. 4, 1975

[54] OIL WATER SEPARATION

[75] Inventor: Richard M. Vennett, Ponca City, Okla.

[73] Assignee: Continental Oil Company, Ponca City, Okla.

[22] Filed: June 25, 1973

[21] Appl. No.: 373,566

[52] U.S. Cl.............. 210/70, 21/58, 21/60.5 R, 208/188, 210/170, 210/511
[51] Int. Cl............................................. B01d 12/00
[58] Field of Search............ 61/.5, 46; 106/287 SB; 208/188; 210/65, 83, 170, 242, 511, DIG. 21, 70; 21/58, 60.5 R

[56] References Cited
UNITED STATES PATENTS

| | | | |
|---|---|---|---|
| 2,680,058 | 6/1954 | Harris et al. | 210/172 X |
| 2,942,424 | 6/1960 | Koble | 61/.5 |
| 2,947,437 | 8/1960 | Greer | 61/46 X |
| 3,003,322 | 10/1961 | Jordan | 61/.5 |
| 3,035,887 | 5/1962 | Willcockson | 21/60.5 R |
| 3,745,770 | 7/1973 | Fraser et al. | 61/.5 |
| 3,780,935 | 12/1973 | Lukacs et al. | 210/65 |

Primary Examiner—Samih N. Zaharna
Assistant Examiner—Robert G. Mukai
Attorney, Agent, or Firm—F. Lindsey Scott

[57] ABSTRACT

A method for separating oil and water in storage vessels by adding a liquid inert to and insoluble in both the oil and the water and having a specific gravity higher than that of the oil and lower than that of the water to form a layer between the oil and the water.

5 Claims, No Drawings

OIL WATER SEPARATION

FIELD OF THE INVENTION

This invention relates to methods for storing oil and water in storage vessels. This invention further relates to a method for maintaining oil and water as separate discrete phases in storage vessels.

DESCRIPTION OF THE PRIOR ART

In many instances, it is desirable that oil and water be stored in storage vessels. For instance, oil-water mixtures are frequently produced in secondary recovery and oftentimes in primary recovery and are pumped to storage vessels where the oil and water are allowed to separate to form separate phases. In recent years, it has been discovered that a convenient method for storing crude oils at sea is the use of undersea crude oil storage vessels. In such vessels, a large cavity is provided beneath the surface of the sea, and the crude oil is thereafter pumped into the upper portion of the vessel, displacing seawater from the lower portion of the vessel until the desired amount of crude oil has been pumped into the underwater storage vessel. Of course, the oil is removed as desired by pumping from the vessel, thus allowing seawater to re-enter from the lower portions of the vessel. In the use of such storage vessels, some problems are the growth of bacteria at the oil-water interface and the formation of emulsions at the oil-water interface. These two problems are frequently present in combination or separately in many vessels wherein oil and water are stored.

In light of the fact that it is inconvenient to be unable to determine accurately the location of the oil-water interface due to bacterial growth or emulsion layers at the interfacial area, much time and effort has been directed to a method whereby the formation of such emulsions and bacterial growth can be avoided.

OBJECT OF THE INVENTION

It is an object of the present invention to provide a method whereby oil and water may be stored in separate phases in storage vessels. It is a further objective of the present invention to provide a method whereby oil and water may be stored in storage vessels without the growth of microorganisms at the oil-water interface and without the formation of emulsions at the oil-water interface.

SUMMARY OF THE INVENTION

It has now been found that the objectives of the present invention are achieved in a method for separating oil and water in storage vessels by adding a liquid inert to and insoluble in both oil and water and having a specific gravity higher than the specific gravity of the oil and lower than the specific gravity of the water to form a layer between the oil and the water.

DESCRIPTION OF PREFERRED EMBODIMENTS

The use of storage vessels to store oil-water mixtures has been common to the oil industry since its early days. The difficulties with emulsions of varying stability at the oil-water interface and the difficulty with microorganism growth at the interface have also been problems since the beginning of the use of storage vessels to store oil and water. The growth of microorganisms and the formation of emulsions at the oil-water interface make it difficult to determine exactly where the oil-water interface is located thereby making it difficult to recover all of the oil from the storage vessel.

It has now been found that oil and water are maintained in separate discrete phases in storage vessels by adding a liquid to a storage vessel which is inert to and insoluble in both oil and water and which has a specific gravity higher than the specific gravity of the oil and lower than the specific gravity of the water to form a layer between the oil and the water. Of course, inert and insoluble are to be given their normal meaning rather than the absolute meaning. In other words, the terms are used to mean substantially inert and substantially insoluble. Several advantages are realized by the use of such an intermediate layer between the oil and the water. For instance, an antimicrobial agent is desirably added to the liquid forming the layer between the oil and the water. Preferably, an antimicrobial agent is selected which is selectively soluble in the material forming the layer, so that the agent is present in the largest quantities at the interfacial layer. Thus, the passage of bacteria and microorganisms from seawater or other water into the oil layer is inhibited if not prevented entirely. The use of the layer between the oil and the water as described hereinbefore provides a moving layer which is able to conform to possible changes in the cross section of the storage tank as the crude oil level rises and falls. As a further advantage, water introduced into the storage vessel with the oil and solids introduced into the storage vessel with the oil are allowed to drop out of the crude oil and into the water beneath the intermediate layer. Thus, the oil pumped into the storage vessel is purified, and by the same method, antimicrobial growth is prevented. Further, the separation of the oil and the water at the interface inhibits and in some instances prevents entirely the formation of emulsions at the interface. Emulsions which may form tend to be much less stable, since, as noted hereinbefore, the water tends to drop out by passing through the layer separating the oil and the water, thus removing the water from the oil zone.

Some materials suitable for use in the method of the present invention are silicone fluids having a viscosity from about 5 to about 5,000 centistokes and a specific gravity from about 0.96 to about 1.05 cc/g. Preferred fluids are those wherein the viscosity is from about 50 to about 2,000 centistokes. Some suitable silicone fluids are dimethylpolysiloxane and methylphenylpolysiloxane. Particularly desirable results have been achieved wherein the fluid is dimethylpolysiloxane silicone fluid.

The method of the present invention is applicable to storage vessels generally wherein oil and water are stored. It is expected, however, that greater benefits will be achieved by the method of the present invention in undersea crude oil storage vessels, since oil is added to and removed from such storage vessels more frequently and since seawater contains numerous types of microorganisms which contribute to microorganism growth at the crude oil-water interface.

The thickness of the layer formed between the oil and the water can vary widely. It is expected that for most uses, it will be found desirable that a layer of at least several molecules in thickness be provided. In a preferred embodiment a layer of at least 1/16 inch is used, and in many applications a layer of about ¼ inch to about 6 inches in thickness is preferred as such a thickness represents a substantial barrier to the passage of bacteria when an antimicrobial agent is included in the layer and the layer is thick enough so that pumping oil into and removing oil from the storage vessel does not tend to force oil through the layer as readily and the like.

It is noted that the description of preferred embodiments hereinbefore is illustrative in nature, and many variations and modifications within the scope of the present invention are possible. In fact, it is anticipated that those skilled in the art may consider many such variations and modifications obvious or desirable in light of the foregoing description of preferred embodiments and the following examples.

EXAMPLES

A sample of crude oil having a specific gravity of about 0.959 cc/g (API 16°) and ASTM seawater (specific gravity 1.10 cc/g) were added to a vessel. A quantity of dimethylpolysiloxane silicone fluid (specific gravity 0.96 and viscosity 50 centistokes) was thereafter added to the vessel. The dimethylpolysiloxane silicone fluid formed a clear layer between the oil and the water. The interface between the dimethylpolysiloxane silicone fluid and the water was clean, and the interface between the dimethylpolysiloxane silicone fluid and the crude oil showed a clean phase separation. The dimethylpolysiloxane silicone fluid used was marketed by General Electric and is identified as SF—96.

The foregoing example clearly shows that oil and water may be maintained in separate discrete phases by the method of the present invention.

Having thus described the invention, I claim:

1. A method for separating and preventing microbial growth between oil and water in storage vessels by adding a liquid inert to and insoluble in both oil and water and having a specific gravity higher than the specific gravity of said oil and lower than the specific gravity of said water to form a layer between said oil and said water, said liquid being selected from the group consisting of dimethylpolysiloxane silicone fluids and methylphenylpoly siloxane silicone fluids and containing an antimicrobial agent.

2. The method of claim 1 wherein said storage vessels are underwater crude oil storage vessels and said water is seawater.

3. The method of claim 2 wherein said liquid is a silicone fluid having a viscosity from about 5 to about 5,000 centistokes and a specific gravity from about 0.96 to about 1.05 cc/g.

4. The method of claim 3 wherein said silicone fluid has a viscosity from about 50 to about 2,000 centistokes.

5. The method of claim 3 wherein said fluid is dimethylpolysiloxane silicone fluid.

* * * * *